United States Patent
Jang (10) Patent No.: US 10,493,977 B2
(45) Date of Patent: Dec. 3, 2019

(54) APPARATUS AND METHOD FOR CONTROLLING START OF ENGINE FOR MILD HYBRID ELECTRIC VEHICLE

(71) Applicant: HYUNDAI MOTOR COMPANY, Seoul (KR)

(72) Inventor: Hwa Young Jang, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 321 days.

(21) Appl. No.: 15/367,933

(22) Filed: Dec. 2, 2016

(65) Prior Publication Data

US 2018/0072300 A1     Mar. 15, 2018

(30) Foreign Application Priority Data

Sep. 9, 2016  (KR) .......................... 10-2016-0116720

(51) Int. Cl.
*B60W 20/10*   (2016.01)
*B60W 20/12*   (2016.01)
(Continued)

(52) U.S. Cl.
CPC ............... *B60W 20/10* (2013.01); *B60K 6/26* (2013.01); *B60K 6/442* (2013.01); *B60L 50/16* (2019.02);
(Continued)

(58) Field of Classification Search
None
See application file for complete search history.

(56) References Cited

U.S. PATENT DOCUMENTS 8,020,650 B2 * 9/2011 Van Maanen ......... B60L 3/0046
                                                180/65.265
2004/0189098 A1 * 9/2004 Algrain .................... F01M 5/02
                                                307/80
(Continued)

FOREIGN PATENT DOCUMENTS

JP         3642249 B2    4/2005
JP      2016-078533 A    5/2016
(Continued)

OTHER PUBLICATIONS

Fujiwara, Machine Translation of JP 2016-078533, espacenet.com (Year: 2016).*

*Primary Examiner* — David P. Merlino
(74) *Attorney, Agent, or Firm* — Morgan, Lewis & Bockius LLP (57) ABSTRACT

An apparatus for controlling a start of an engine for a mild hybrid electric vehicle includes: a mild hybrid starter & generator (MHSG) starting an engine; a first battery connected to the MHSG through a first power cable and supplying electric power to the MHSG; a low voltage DC-DC converter (LDC) converting voltage supplied from the first battery into low voltage; a second battery supplying the low voltage to an electric load that uses the low voltage; an ignition switch including a first contact point and a second contact point; a data detector detecting data for controlling the engine start for a mild hybrid electric vehicle; and a controller determining whether a charging condition of the second battery is satisfied based on the data, and charging the second battery with electric power of the first battery when the charging condition of the second battery is satisfied.

12 Claims, 4 Drawing Sheets

(51) Int. Cl.
*B60K 6/26* (2007.10)
*B60K 6/442* (2007.10)
*B60W 10/06* (2006.01)
*B60W 10/08* (2006.01)
*B60W 10/26* (2006.01)
*B60L 50/61* (2019.01)
*B60L 50/16* (2019.01)
*B60L 58/12* (2019.01)

(52) U.S. Cl.
CPC ............... *B60L 50/61* (2019.02); *B60L 58/12* (2019.02); *B60W 10/06* (2013.01); *B60W 10/08* (2013.01); *B60W 10/26* (2013.01); *B60W 20/12* (2016.01); *B60L 2210/10* (2013.01); *B60L 2240/62* (2013.01); *B60L 2260/50* (2013.01); *B60W 2510/244* (2013.01); *B60W 2550/12* (2013.01); *B60W 2550/402* (2013.01); *B60W 2710/06* (2013.01); *B60W 2710/08* (2013.01); *B60W 2710/248* (2013.01); *Y02T 10/6217* (2013.01); *Y02T 10/705* (2013.01); *Y02T 10/7005* (2013.01); *Y02T 10/7044* (2013.01); *Y02T 10/7077* (2013.01); *Y02T 10/7291* (2013.01); *Y02T 90/16* (2013.01); *Y02T 90/162* (2013.01); *Y10S 903/93* (2013.01)

(56) References Cited

U.S. PATENT DOCUMENTS

| 2005/0228553 | A1* | 10/2005 | Tryon | B60K 6/46 701/22 |
| 2006/0198072 | A1* | 9/2006 | Inaba | H03K 19/00376 361/90 |
| 2010/0001523 | A1* | 1/2010 | Sato | B60K 6/48 290/31 |
| 2011/0133694 | A1* | 6/2011 | Song | B60L 1/14 320/109 |
| 2015/0149014 | A1* | 5/2015 | Kees | B60L 1/00 701/22 |
| 2015/0162652 | A1* | 6/2015 | Yang | H01M 10/625 429/50 |
| 2015/0226171 | A1* | 8/2015 | Kees | B60K 6/485 290/31 |
| 2016/0185225 | A1* | 6/2016 | Namuduri | B60L 1/003 701/22 |
| 2017/0008469 | A1* | 1/2017 | Holmes | B60K 6/485 |
| 2017/0297440 | A1* | 10/2017 | Hu | B60L 50/15 |

FOREIGN PATENT DOCUMENTS

KR 10-2003-0048854 A 6/2003
KR 10-1602818 B1 3/2016

\* cited by examiner

APPARATUS AND METHOD FOR CONTROLLING START OF ENGINE FOR MILD HYBRID ELECTRIC VEHICLE

CROSS-REFERENCE TO RELATED APPLICATION

This application claims the benefit of priority to Korean Patent Application No. 10-2016-0116720 filed in the Korean Intellectual Property Office on Sep. 9, 2016, the entire content of which is incorporated herein by reference.

TECHNICAL FIELD

The present disclosure relates to a method and an apparatus for controlling a start of an engine for a mild hybrid electric vehicle.

BACKGROUND

As well known, a hybrid electric vehicle uses both an internal combustion engine and a battery power source. That is, the hybrid electric vehicle uses an efficient combination of power of the internal combustion engine and power of a motor.

Based on a power sharing ratio between the engine and the motor, the hybrid electric vehicle may be classified into a mild type hybrid electric vehicle and a hard type hybrid electric vehicle. The mild type hybrid electric vehicle (hereinafter, referred to as a mild hybrid electric vehicle) includes a mild hybrid starter & generator (MHSG), which starts the engine or generates electric power by using an output of the engine, instead of an alternator. The hard type hybrid electric vehicle is provided with an integrated starter & generator (ISG) which starts the engine or generates electric power by using the output of the engine, and a drive motor which drives the vehicle, and the ISG and the drive motor are separately provided.

In the case of the mild hybrid electric vehicle, there is no traveling mode in which the vehicle is driven only by torque of the MHSG, but torque of the engine may be supplemented by using the MHSG in accordance with a traveling state, and a battery (e.g., a 48V battery) may be charged by regenerative braking. Therefore, fuel economy of the mild hybrid electric vehicle may be improved.

As a battery which supplies electric power to the MHSG or is charged with electric power recovered by the MHSG, a lithium-ion battery is used. That is, in order to exhibit optimum performance of the MHSG, a battery, which is fast in charging and discharging speeds and has improved durability, is used.

However, the lithium-ion battery has a problem in that energy storage performance and charging and discharging efficiency deteriorate in an extremely low-temperature state. Therefore, at a below zero temperature, the lithium-ion battery cannot supply sufficient electric power to the MHSG, and as a result, the engine cannot be started.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an apparatus and a method for controlling a start of an engine for a mild hybrid electric vehicle, which is capable of starting an engine by supplying sufficient electric power to a mild hybrid starter & generator (MHSG) even at a low outdoor temperature.

According to an exemplary embodiment of the present disclosure, an apparatus for controlling a start of an engine for a mild hybrid electric vehicle includes: a mild hybrid starter & generator (MHSG) which starts an engine or generates electric power by using an output of the engine; a first battery which is connected to the MHSG through a first power cable and supplies electric power to the MHSG or is charged with electric power generated by the MHSG; a low voltage DC-DC converter (LDC) which converts voltage supplied from the first battery into a low voltage; a second battery which supplies the low voltage to an electric load that uses the low voltage; an ignition switch which includes a first contact point and a second contact point; a data detector which detects data for controlling the engine start for a mild hybrid electric vehicle; and a controller which determines whether a charging condition of the second battery is satisfied based on the data, and charges the second battery with electric power of the first battery when the charging condition of the second battery is satisfied, in which the MHSG is connected with the second battery through a second power cable.

The controller may compare an estimated time with a reference time when a destination is set, and may determine whether the charging condition of the second battery is satisfied when the estimated time is shorter than the reference time.

The controller may determine whether the first contact point of the ignition switch is selected when a destination is not set, and may determine whether the charging condition of the second battery is satisfied when the first contact point of the ignition switch is selected.

The charging condition of the second battery may be satisfied when an outdoor temperature is equal to or lower than a reference temperature and an SOC of the second battery is equal to or lower than a first reference SOC.

When the second contact point of the ignition switch is selected, the controller may determine whether a discharging condition of the second battery is satisfied based on the data, and when the discharging condition of the second battery is satisfied, the controller may start the engine by supplying electric power of the second battery to the MHSG through the second power cable.

The discharging condition of the second battery may be satisfied when the SOC of the first battery is equal to or lower than a second reference SOC.

When the discharging condition of the second battery is not satisfied, the controller may start the engine by supplying electric power of the first battery to the MHSG.

The data detector may include: a navigation device which determines a route of the mild hybrid electric vehicle from a current position to a destination; a first SOC sensor which detects the SOC of the first battery; a second SOC sensor which detects the SOC of the second battery; and an outdoor temperature sensor which detects an outdoor temperature outside the mild hybrid electric vehicle.

According to another exemplary embodiment of the present disclosure, a method for controlling a start of an engine for a mild hybrid electric vehicle includes: a mild hybrid starter & generator (MHSG) which starts an engine or generates electric power by using an output of the engine; a first battery which is connected to the MHSG through a first power cable; a low voltage DC-DC converter (LDC) which converts voltage supplied from the first battery into low voltage; a second battery which is connected to the MHSG through a second power cable and supplies the low voltage to an electric load that uses the low voltage; and an ignition switch which includes a first contact point and a second contact point, the method including: detecting data for controlling the engine start; determining whether a charging condition of the second battery is satisfied based on the data; charging the second battery with electric power of the first battery when the charging condition of the second battery is satisfied; determining whether a discharging condition of the second battery is satisfied based on the data when the second contact point of the ignition switch is selected; and starting the engine by supplying electric power of the second battery the MHSG through the second power cable when the discharging condition of the second battery is satisfied.

The determining of whether the charging condition of the second battery is satisfied may be performed when a destination is set and an estimated time is shorter than a reference time.

The determining of whether the charging condition of the second battery is satisfied may be performed when the first contact point of the ignition switch is selected.

The charging condition of the second battery may be satisfied when an outdoor temperature is equal to or lower than a reference temperature and an SOC of the second battery is equal to or lower than a first reference SOC.

The determining of whether the discharging condition of the second battery is satisfied may be performed when the second contact point of the ignition switch is selected.

The discharging condition of the second battery may be satisfied when the SOC of the first battery is equal to or lower than a second reference SOC.

The method for controlling a start of an engine for a mild hybrid electric vehicle may further include starting the engine by supplying electric power of the first battery to the MHSG when the discharging condition of the second battery is not satisfied.

According to the exemplary embodiments of the present disclosure as described above, it is possible to start the engine by supplying sufficient electric power to the MHSG even in a state in which the SOC of the first battery is not sufficient because of a low outdoor temperature.

DETAILED DESCRIPTION OF THE EMBODIMENTS

Hereinafter, exemplary embodiments of the present disclosure will be described in detail with reference to the accompanying drawings so that those skilled in the technical field to which the present disclosure pertains may easily carry out the exemplary embodiments. However, the present disclosure is not limited to the exemplary embodiments to be described below and may be specified as other aspects.

A part irrelevant to the description will be omitted to clearly describe the present disclosure, and the same or similar constituent elements will be designated by the same reference numerals throughout the specification.

In addition, each configuration illustrated in the drawings is arbitrarily shown for understanding and ease of description, but the present disclosure is not limited thereto.

Figure 1:
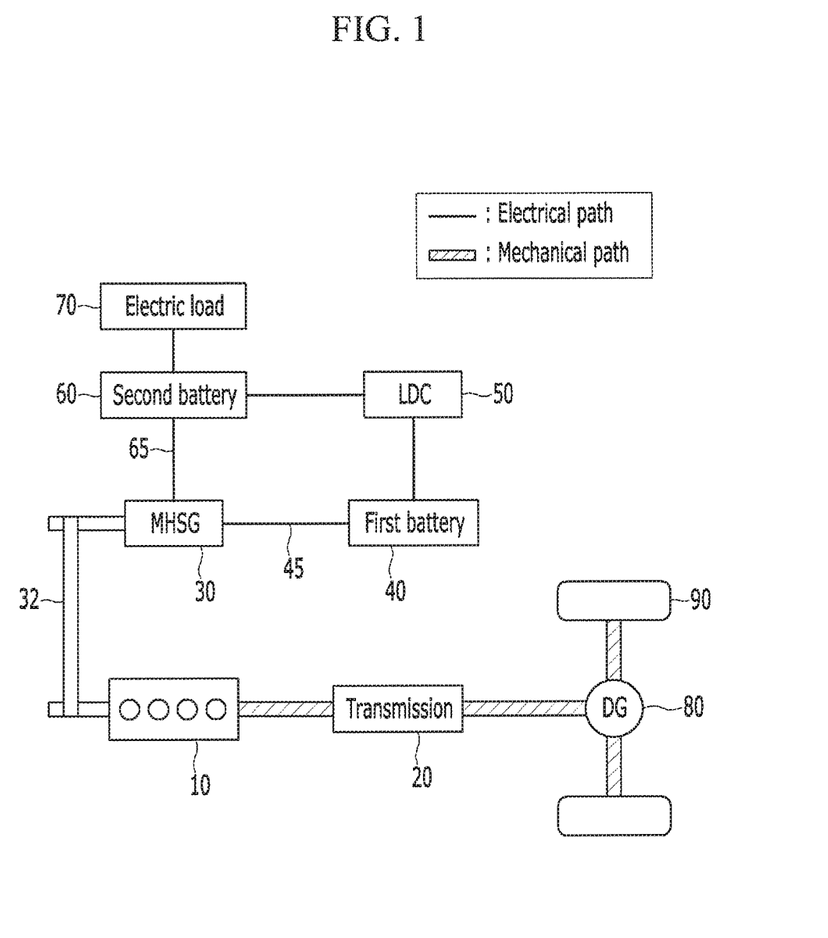
FIG. 1 is a block diagram illustrating a mild hybrid electric vehicle according to an exemplary embodiment of the present disclosure.

FIG. 1 is a block diagram illustrating a mild hybrid electric vehicle according to an exemplary embodiment of the present disclosure.

As illustrated in FIG. 1, a mild hybrid electric vehicle according to an exemplary embodiment of the present disclosure includes an engine 10, a transmission 20, a mild hybrid starter & generator (MHSG) 30, a first battery 40, a low voltage DC-DC converter (LDC) 50, a second battery 60, an electric load 70, a differential gear 80, and wheels 90.

The engine 10 generates a torque by combusting fuel. Various engines such as a gasoline engine, a diesel engine, and a liquefied petroleum injection (LPI) engine may be used as the engine 10.

Power transmission of the mild hybrid electric vehicle is performed such that the torque of the engine 10 is transmitted to an input shaft of the transmission 20, and a torque outputted from an output shaft of the transmission 20 is transmitted to an axle via the differential gear 80. As the axle rotates the wheels 90, the mild hybrid electric vehicle travels by torque of the engine 10.

The transmission 20 may be an automatic transmission or a manual transmission. The automatic transmission controls hydraulic pressure by operating a plurality of solenoid valves based on a speed of the mild hybrid electric vehicle and a position of an accelerator pedal, such that a shift gear is operated at a target gear stage and a gear shift operation is automatically performed. In a case of the manual transmission, a gear shift operation is performed as a driver steps on a clutch pedal and moves a gear lever to a desired gear stage.

The MHSG 30 converts electrical energy into mechanical energy, or converts mechanical energy into electrical energy. That is, the MHSG 30 may start the engine 10 or may generate electric power by using output of the engine 10. In addition, the MHSG 30 may supplement the torque of the engine 10. The mild hybrid electric vehicle may use a torque of the MHSG 30 as an auxiliary power while using the combustion torque of the engine 10 as a main power. The engine 10 and the MHSG 30 may be connected through a belt 32.

The first battery 40 may supply electric power to the MHSG 30 through a first power cable 45, or may be charged with electric power recovered by the MHSG 30. The first battery 40 may be a lithium-ion battery which is a high-voltage battery (e.g., a 48 V battery). The first battery 40 may be referred to as a main battery. The lithium-ion battery is fast in charging and discharging speeds and has good durability, but energy storage performance and charging and discharging efficiency may deteriorate in an extremely low-temperature state.

The LDC 50 converts voltage (e.g., 48 V) supplied from the first battery 40 into low voltage (e.g., 12 V), and charges the second battery 60.

The second battery 60 may be charged with electric power supplied from the LDC 50. The second battery 60 may be an absorptive glass mat (AGM) battery or a lead-acid battery as a low voltage battery (e.g., a 12 V battery). The second battery 60 may be referred to as an auxiliary battery. The second battery 60 supplies electric power to the electric load 70 that uses low voltage (e.g., 12 V). The second battery 60 according to an exemplary embodiment of the present disclosure may supply electric power to the MHSG 30 through a second power cable 65.

The electric load 70 includes various electric or electronic devices such as head lamps, an air conditioner, and wipers that use electric power of the second battery 60.

Figure 2:
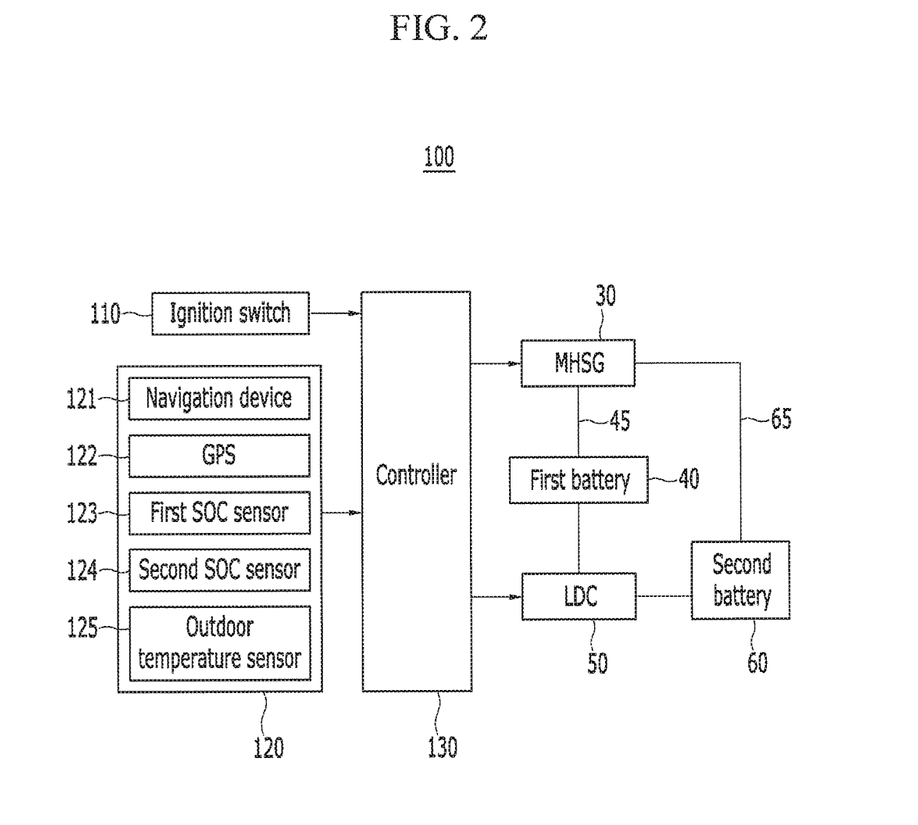
FIG. 2 is a block diagram illustrating an apparatus for controlling a start of an engine for a mild hybrid electric vehicle according to the exemplary embodiment of the present disclosure.

FIG. 2 is a block diagram illustrating an apparatus for controlling a mild hybrid electric vehicle according to an exemplary embodiment of the present disclosure.

As illustrated in FIG. 2, the apparatus for controlling the mild hybrid electric vehicle may include an ignition switch 110, a data detector 120, a controller 130, the MHSG 30, the first battery 40, the LDC 50, the second battery 60, the first power cable 45, and the second power cable 65.

The ignition switch 110 may include a plurality of contact points. The plurality of contact points may include an OFF contact point (hereinafter, referred to as a first contact point), an ACC contact point, an ON contact point (hereinafter, referred to as a second contact point), and a START contact point. When the first contact point is selected, the engine 10 is turned off. When the ACC contact point is selected, accessory devices such as a radio may be used. When the ON contact point is selected, electronic devices, which use voltage of the first battery 40 and the second battery 60, may be used. When the second contact point is selected, the engine 10 starts. The contact points of the ignition switch 110 may be selected by a start key or a start button.

The data detector 120 detects data for controlling the start of the engine for a mild hybrid electric vehicle, and the data detected by the data detector 120 is transferred to the controller 130. The data detector 120 may include a navigation device 121, a global positioning system (GPS) 122, a first SOC sensor 123, a second SOC sensor 124, and an outdoor temperature sensor 125, The data detector 120 may further include detection units (e.g., an accelerator pedal position detection unit, a brake pedal position detection unit, and the like) for controlling the mild hybrid electric vehicle.

The navigation device 121 determines a route of the mild hybrid electric vehicle from the current position to a destination. The navigation device 121 may include an input and output unit which inputs and outputs information about route guidance, a current position detection unit which detects information associated with a current position of the vehicle, a memory which stores map data required to calculate a route and data required to guide the route, a control unit which searches a route and guides the route, and a display unit which displays the route.

The GPS 122 receives radio waves from a GPS satellite, and transmits related signals to the navigation device 121. The navigation device 121 may calculate the current position of the vehicle based on the signals.

The first SOC sensor 123 detects a state of charge (SOC) of the first battery 40, and transmits signals associated with the SOC to the controller 130. Instead of directly detecting the SOC of the first battery 40, electric current and voltage of the first battery 40 may be measured, and then the SOC of the first battery 40 may be predicted based on the electric current and the voltage of the first battery 40.

The second SOC sensor 124 detects an SOC of the second battery 60, and transmits signals associated with the SOC to the controller 130.

The outdoor temperature sensor 125 detects an outdoor temperature outside the mild hybrid electric vehicle, and transmits signals associated with the outdoor temperature to the controller 130.

The controller 130 may control a start of the engine based on the signals of the ignition switch 110 and the data detector 120. The controller 130 may supply electric power of the first battery 40 to the MHSG 30, thereby starting the engine 10. In addition, since the MHSG 30 is connected with the second battery 60 through the second power cable 65, the controller 130 may start the engine 10 by supplying electric power of the second battery 60 to the MHSG 30. To this end, the controller 100 may be implemented as one or more processors operated by a preset program, and the preset program may include a series of commands for performing respective steps included in the following method for controlling a start of the engine for a mild hybrid electric vehicle according to the exemplary embodiment of the present disclosure. The controller 100 may be a general engine control unit (ECU).

Hereinafter, referring to FIGS. 3 and 4, the method for controlling a start of the engine for a mild hybrid electric vehicle according to the exemplary embodiment of the present disclosure will be specifically described.

Figure 3:
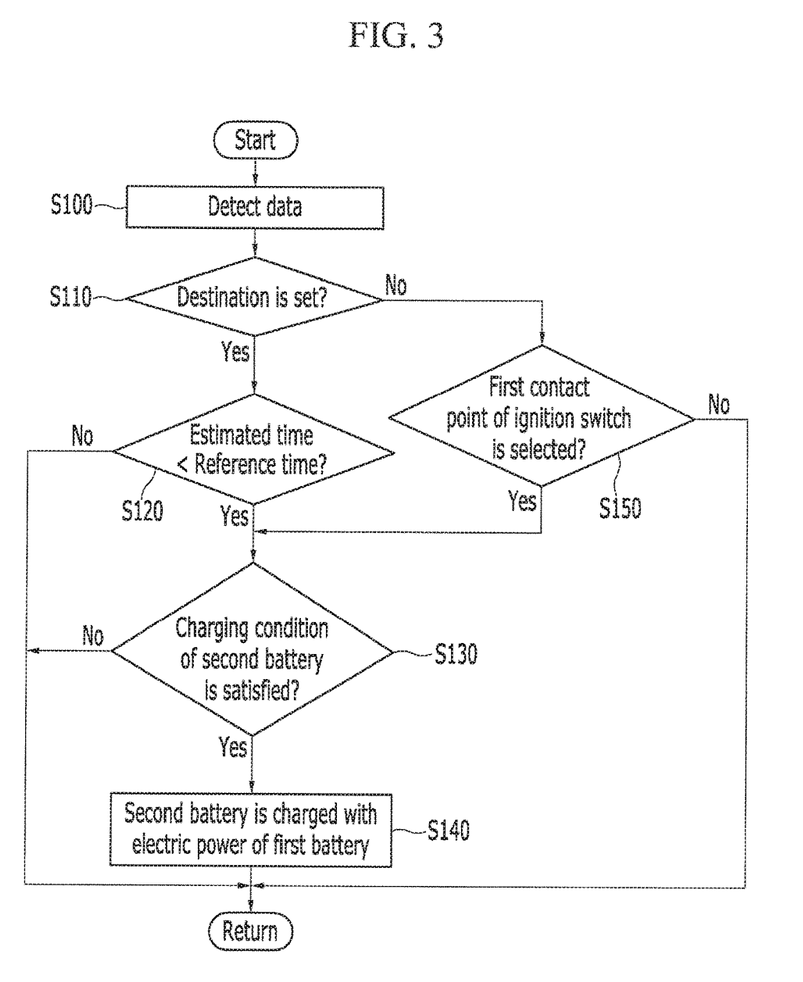
FIG. 3 is a flowchart illustrating a process of charging a second battery in a method for controlling a start of the engine for a mild hybrid electric vehicle according to the exemplary embodiment of the present disclosure.

FIG. 3 is a flowchart illustrating a process of charging a second battery in the method for controlling a start of the engine for a mild hybrid electric vehicle according to the exemplary embodiment of the present disclosure.

As illustrated in FIG. 3, the method for controlling a start of the engine for a mild hybrid electric vehicle according to the exemplary embodiment of the present disclosure starts by detecting data for controlling the start of the engine 10 (S100). That is, in a case in which a destination of the mild hybrid electric vehicle is preset, the navigation device 121 may calculate an estimated time required for the mild hybrid electric vehicle to move from the current position to the destination. In addition, the first SOC sensor 123 may detect the SOC of the first battery 40, the second SOC sensor 124 may detect the SOC of the second battery 60, and the outdoor temperature sensor 125 may detect an outdoor temperature outside the mild hybrid electric vehicle.

Based on the signal of the navigation device 121, the controller 130 determines whether a destination of the mild hybrid electric vehicle is set (S110).

If it is determined in step S110 that the destination is set, the controller 130 compares the estimated time with a reference time (S120). The reference time may be set to a period of time (e.g., 5 minutes) determined as an appropriate time by those skilled in the art in consideration of the time required to charge the second battery 60 by using electric power of the first battery 40.

If the estimated time is equal to or longer than the reference time in step S120, the controller 130 continues to monitor the estimated time.

If the estimated time is shorter than the reference time in step S120, the controller 130 determines whether a charging condition of the second battery 60 is satisfied (S130). The charging condition of the second battery 60 may be satisfied in a case in which the outdoor temperature is equal to or lower than a reference temperature and the SOC of the second battery 60 is equal to or lower than a first reference SOC. The reference temperature may be set to a temperature determined as an appropriate temperature by those skilled in the art in consideration of energy storage performance of the first battery 40 in a low-temperature state. The first reference SOC may be set to an SOC determined as an appropriate SOC by those skilled in the art in consideration of the SOC of the second battery 60 which is required to perform a next start of the engine 10.

If the charging condition of the second battery 60 is satisfied in step S130, the controller 130 charges the second battery 60 with electric power of the first battery 40 (S140). That is, the controller 130 converts voltage, which is supplied from the first battery 40, into low voltage through the LDC 50, and charges the second battery 60. The controller 130 may charge the second battery 60 until the SOC of the second battery 60 reaches an SOC required to perform a next start of the engine 10. Therefore, when the mild hybrid electric vehicle reaches the destination and the engine 10 is turned off, the SOC of the second battery 60 may be sufficient to perform a next start of the engine 10.

If it is determined in step S110 that the destination is not set, the controller 130 determines whether the first contact point of the ignition switch 110 is selected (S150). The first contact point may be the OFF contact point of the ignition switch 110.

If the first contact point is not selected in step S150, the controller 130 continues to monitor whether the first contact point is selected.

If the first contact point is selected in step S150, the controller 130 determines whether the charging condition of the second battery 60 is satisfied (S130).

If the charging condition of the second battery is satisfied in step S130, the controller 130 converts voltage, which is supplied from the first battery 40, into low voltage through the LDC 50 and charges the second battery 60. That is, even when the engine 10 is turned off, the controller 130 may operate the LDC 50 until the SOC of the second battery 60 reaches the SOC required to perform a next start of the engine 10.

Figure 4:
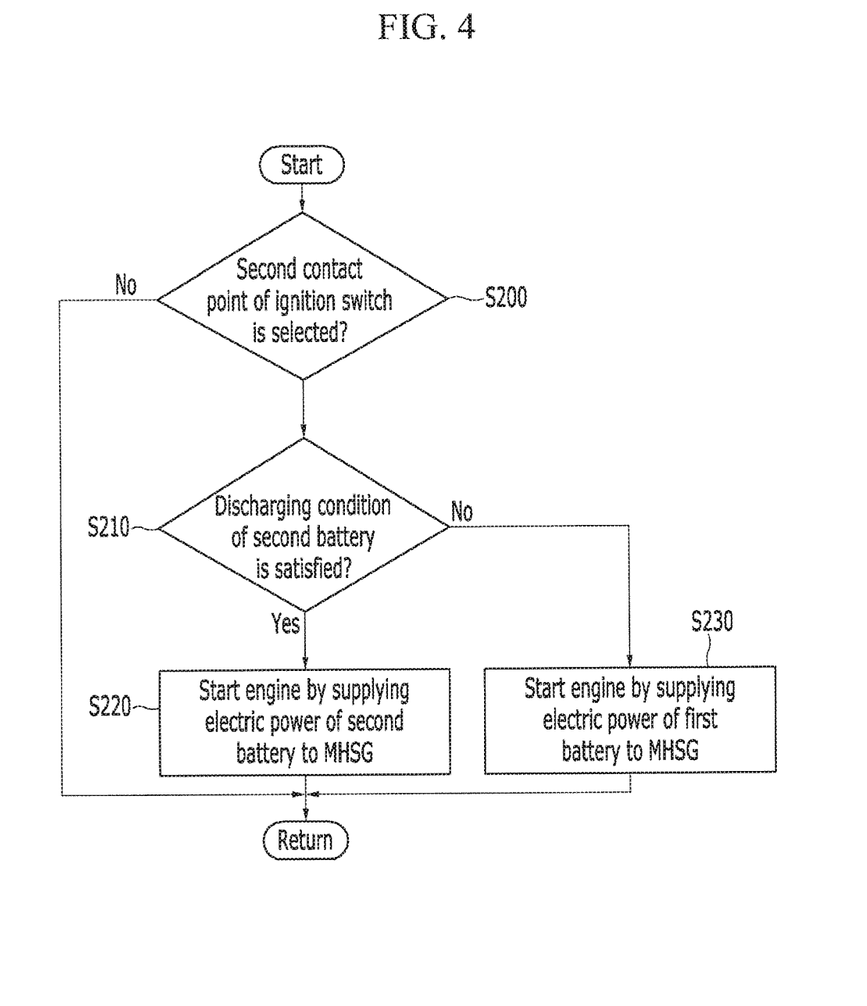
FIG. 4 is a flowchart illustrating a process when the second battery is discharged in the method of controlling a start of the engine for a mild hybrid electric vehicle according to the exemplary embodiment of the present disclosure

FIG. 4 is a flowchart illustrating a process when the second battery is discharged in the method of controlling a start of the engine for a mild hybrid electric vehicle according to the exemplary embodiment of the present disclosure.

As illustrated in FIG. 4, the controller 130 determines whether the second contact point of the ignition switch 110 is selected (S200). The second contact point may be the START contact point of the ignition switch 110.

If the second contact point is not selected in step S200, the method for controlling the mild hybrid electric vehicle according to the exemplary embodiment of the present disclosure ends.

If the second contact point is selected in step S200, the controller 130 determines whether a discharging condition of the second battery 60 is satisfied (S210). The discharging condition of the second battery 60 may be satisfied in a case in which the SOC of the first battery 40 is equal to or lower than a second reference SOC. The second reference SOC may be set to an SOC determined as an appropriate SOC by those skilled in the art in consideration of the SOC of the first battery 40 which is required to start the engine 10.

If the discharging condition of the second battery 60 is satisfied in step S210, the controller 130 may start the engine 10 by supplying electric power of the second battery 60 to the MHSG 30 through the second power cable 65 (S220).

If the discharging condition of the second battery 60 is not satisfied in step S210, the controller 130 may start the engine 10 by supplying electric power of the first battery 40 to the MHSG 30 (S230).

According to the exemplary embodiment of the present disclosure as described above, it is possible to start the engine 10 by supplying sufficient electric power to the MHSG 30 even in a state in which the SOC of the first battery 40 is not sufficient because of a low outdoor temperature.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. An apparatus for controlling a start of an engine for a mild hybrid electric vehicle, the apparatus comprising:
a mild hybrid starter & generator (MHSG) which starts an engine or generates electric power by using an output of the engine;
a high voltage battery which is connected to the MHSG through a first power cable and supplies electric power to the MHSG or is charged with electric power generated by the MHSG;
a low voltage DC-DC converter (LDC) which converts voltage supplied from the high voltage battery into a low voltage;
a low voltage battery which supplies the low voltage to an electric load that uses the low voltage;
an ignition switch which includes a first contact point and a second contact point;
a data detector which detects data for controlling the engine start of a mild hybrid electric vehicle; and
a controller which determines whether a charging condition of the low voltage battery is satisfied based on the data, and charges the low voltage battery with electric power of the high voltage battery to a state of charge (SOC) of the low voltage battery sufficient to perform a next start of the engine in response to the charging condition of the low voltage battery being satisfied,
wherein the MHSG is connected with the low voltage battery through a second power cable, and
wherein the charging condition of the low voltage battery is satisfied when an outdoor temperature is equal to or lower than a reference temperature and the SOC of the low voltage battery is equal to or lower than a first reference SOC.

2. The apparatus of claim 1, wherein the controller compares an estimated time with a reference time when a destination is set, and determines whether the charging condition of the low voltage battery is satisfied when the estimated time is shorter than the reference time.

3. The apparatus of claim 1, wherein the controller determines whether the first contact point of the ignition switch is selected when a destination is not set, and determines whether the charging condition of the low voltage battery is satisfied when the first contact point of the ignition switch is selected.

4. The apparatus of claim 1, wherein when the second contact point of the ignition switch is selected, the controller determines whether a discharging condition of the low voltage battery is satisfied based on the data, and when the discharging condition of the low voltage battery is satisfied, the controller starts the engine by supplying electric power of the low voltage battery to the MHSG through the second power cable.

5. The apparatus of claim 4, wherein the discharging condition of the low voltage battery is satisfied when an SOC of the high voltage battery is equal to or lower than a second reference SOC.

6. The apparatus of claim 4, wherein when the discharging condition of the low voltage battery is not satisfied, the controller starts the engine by supplying electric power of the high voltage battery to the MHSG.

7. The apparatus of claim 1, wherein the data detector includes:
- a navigation device which determines a route of the mild hybrid electric vehicle from a current position to a destination;
- a first SOC sensor which detects an SOC of the high voltage battery;
- a second SOC sensor which detects the SOC of the low voltage battery; and
- an outdoor temperature sensor which detects the outdoor temperature outside the mild hybrid electric vehicle.

8. A method for controlling a start of an engine for a mild hybrid electric vehicle, wherein the mild hybrid electric vehicle includes: a mild hybrid starter & generator (MHSG) which starts an engine or generates electric power by using an output of the engine; a high voltage battery which is connected to the MHSG through a first power cable; a low voltage DC-DC converter (LDC) which converts voltage supplied from the high voltage battery into low voltage; a low voltage battery which is connected to the MHSG through a second power cable and supplies the low voltage to an electric load that uses the low voltage; and an ignition switch which includes a first contact point and a second contact point, the method comprising steps of:
- detecting, by a data detector, data for controlling the engine start;
- determining, by a controller, whether a charging condition of the low voltage battery is satisfied based on the data;
- charging, by the controller, the low voltage battery with electric power of the high voltage battery to a state of charge (SOC) of the low voltage battery sufficient to perform a next start of the engine when the charging condition of the low voltage battery is satisfied;
- determining, by the controller, whether a discharging condition of the low voltage battery is satisfied based on the data when the second contact point of the ignition switch is selected; and
- starting, by the controller, the engine by supplying electric power of the low voltage battery to the MHSG through the second power cable when the discharging condition of the low voltage battery is satisfied,
wherein the charging condition of the low voltage battery is satisfied when an outdoor temperature is equal to or lower than a reference temperature and the SOC of the low voltage battery is equal to or lower than a first reference SOC.

9. The method of claim 8, wherein the step of determining whether the charging condition of the low voltage battery is satisfied is performed when a destination is set and an estimated time is shorter than a reference time.

10. The method of claim 8, wherein the step of determining whether the charging condition of the low voltage battery is satisfied is performed when the first contact point of the ignition switch is selected.

11. The method of claim 8, wherein the discharging condition of the low voltage battery is satisfied when an SOC of the high voltage battery is equal to or lower than a second reference SOC.

12. The method of claim 8, further comprising starting the engine by supplying electric power of the high voltage battery to the MHSG when the discharging condition of the low voltage battery is not satisfied.

\* \* \* \* \*

UNITED STATES PATENT AND TRADEMARK OFFICE
CERTIFICATE OF CORRECTION

| | | |
|---|---|---|
| PATENT NO. | : 10,493,977 B2 | Page 1 of 1 |
| APPLICATION NO. | : 15/367933 | |
| DATED | : December 3, 2019 | |
| INVENTOR(S) | : Hwa Yong Jang | |

It is certified that error appears in the above-identified patent and that said Letters Patent is hereby corrected as shown below:

On the Title Page

At Item (72) Inventor, replace "Hwa Young JANG" with -- Hwa Yong JANG --.

Signed and Sealed this
Seventh Day of February, 2023

Katherine Kelly Vidal
Director of the United States Patent and Trademark Office